(12) United States Patent
Kadobayashi

(10) Patent No.: US 11,438,479 B2
(45) Date of Patent: Sep. 6, 2022

(54) SEMICONDUCTOR DEVICE, REPLACEMENT PART, AND IMAGE FORMING APPARATUS

(71) Applicant: KYOCERA Document Solutions Inc., Osaka (JP)

(72) Inventor: Izumi Kadobayashi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 278 days.

(21) Appl. No.: 16/846,167

(22) Filed: Apr. 10, 2020

(65) Prior Publication Data

US 2020/0336618 A1 Oct. 22, 2020

(30) Foreign Application Priority Data

Apr. 19, 2019 (JP) .............................. JP2019-080116

(51) Int. Cl.

| | |
|---|---|
| *H04N 1/00* | (2006.01) |
| *G03G 15/00* | (2006.01) |
| *G03G 21/00* | (2006.01) |
| *G05D 23/19* | (2006.01) |
| *G05B 15/02* | (2006.01) |
| *G06F 1/26* | (2006.01) |
| *G03G 15/08* | (2006.01) |
| *G03G 21/18* | (2006.01) |

(52) U.S. Cl.
CPC ..... *H04N 1/00978* (2013.01); *G03G 15/0863* (2013.01); *G03G 15/80* (2013.01); *G03G 21/1892* (2013.01); *G05B 15/02* (2013.01); *G05D 23/1917* (2013.01); *G06F 1/26* (2013.01); *H04N 1/00891* (2013.01)

(58) Field of Classification Search
CPC ............... G03G 15/0863; G03G 15/80; G03G 21/1875; G03G 21/1892; G05B 15/02; G05D 23/1917; G06F 1/26; H04N 1/00891; H04N 1/00978
See application file for complete search history.

(56) References Cited

U.S. PATENT DOCUMENTS

| | | | |
|---|---|---|---|
| 7,272,063 B1* | 9/2007 | Egerer | ...................... G11C 7/16 365/211 |
| 10,983,455 B2* | 4/2021 | Mitsunobu | ......... G03G 15/0863 |
| 2015/0063838 A1* | 3/2015 | Yagi | ................... G03G 15/0863 399/27 |

FOREIGN PATENT DOCUMENTS

JP 2009-014991 A 1/2009

\* cited by examiner

*Primary Examiner* — Sophia S Chen
(74) *Attorney, Agent, or Firm* — Studebaker & Brackett PC

(57) ABSTRACT

A semiconductor device includes a load element, a switching element, and a processor. The load element controls a temperature of the semiconductor device with an electric current supplied to the load element. The switching element switches between supply of an electric current to the load element and a cut-off of the supply. The processor controls the switching element. The processor controls the electric current to be supplied to the load element through the switching element so that the semiconductor device has a series of temperatures represented by a specific temperature profile.

6 Claims, 5 Drawing Sheets

SEMICONDUCTOR DEVICE, REPLACEMENT PART, AND IMAGE FORMING APPARATUS

INCORPORATION BY REFERENCE

The present application claims priority under 35 U.S.C. § 119 to Japanese Patent Application No. 2019-080116, filed on Apr. 19, 2019. The contents of this application are incorporated herein by reference in their entirety.

BACKGROUND

The present disclosure relates to a semiconductor device, a replacement part, and an image forming apparatus.

An image forming apparatus includes a toner unit, an engine section, and a controller. The toner unit includes an IC chip. The IC chip stores therein toner unit related information and first authentication information. Here, the toner unit related information represents information related to a toner unit. The first authentication information is generated from a first authentication key and partial information that is part of the toner unit related information.

The engine section includes a reading means. The reading means reads the toner unit related information and the first authentication information from the IC chip.

The controller includes an authentication information generating means and an authentication means. The authentication information generating means generates second authentication information from a second authentication key held in the image forming apparatus and the read partial information. The authentication means authenticates the toner unit based on the first authentication information read by the reading means and the second authentication information generated by the authentication information generating means.

SUMMARY

A semiconductor device according to an aspect of the present disclosure includes a load element, a switching element, and a processor. The load element controls a temperature of the semiconductor device with an electric current supplied to the load element. The switching element switches between supply of an electric current to the load element and a cut-off of the supply. The processor controls the switching element. The processor controls the electric current to be supplied to the load element through the switching element so that the semiconductor device has a series of temperatures represented by a specific temperature profile.

A replacement part according to another aspect of the present disclosure is attachable to an image forming apparatus and accommodates a consumable to be supplied to the image forming apparatus. The replacement part includes a container and a semiconductor device. The container accommodates the consumable. The semiconductor device includes a load element, a switching element, and a processor. The load element controls a temperature of the semiconductor device with an electric current supplied to the load element. The switching element switches between supply of an electric current to the load element and a cut-off of the supply. The processor controls the switching element. The processor controls the electric current to be supplied to the load element through the switching element so that the semiconductor device has a series of temperatures represented by a specific temperature profile.

An image forming apparatus according to still another aspect of the present disclosure allows a replacement part including a semiconductor device to be attached thereto. The image forming apparatus consumes a consumable accommodated in the replacement part to form an image on a sheet. The image forming apparatus includes a temperature detector and a controller. The temperature detector detects a temperature of the semiconductor device. The controller determines whether or not the series of temperatures detected by the temperature detector forms a specific temperature profile.

DETAILED DESCRIPTION

Figure 1:
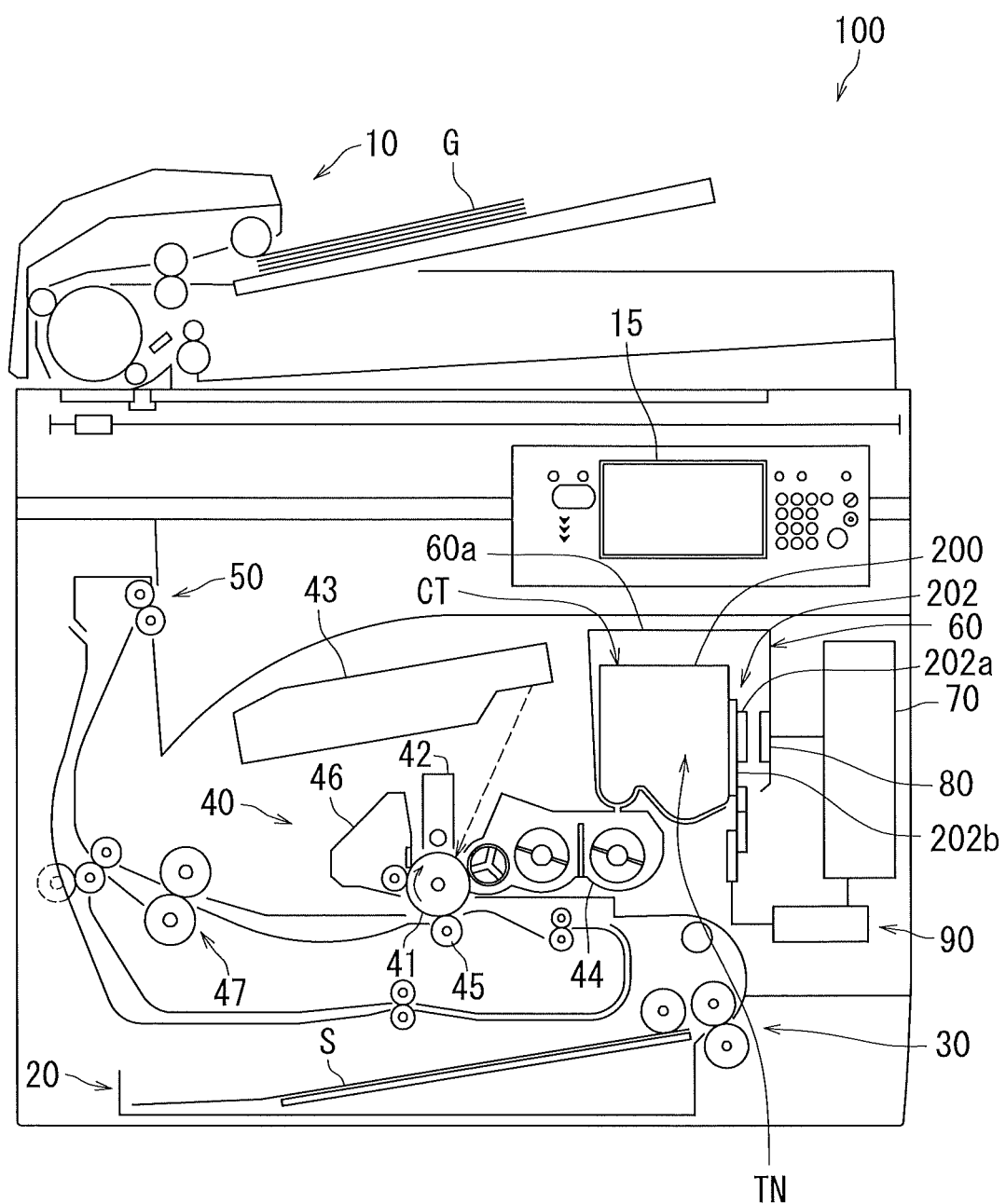
FIG. 1 is a schematic sectional view of an image forming apparatus according to a first embodiment of the present disclosure.

Embodiments of the present disclosure will hereinafter be described with reference to the accompany drawings. Elements that are the same or equivalent are labelled with the same reference signs in the drawings and description thereof is not repeated.

First Embodiment

An image forming apparatus 100 according to a first embodiment of the present disclosure will be described with reference to FIGS. 1 to 4. The image forming apparatus 100 will first be described with reference to FIG. 1. FIG. 1 is a schematic sectional view of the image forming apparatus 100. As illustrated in FIG. 1, the image forming apparatus 100 is an electrographic image forming apparatus. Examples of the image forming apparatus 100 include a printer, a copier, and a multifunction peripheral. The image forming apparatus 100 may have a facsimile function.

The image forming apparatus 100 allows a replacement part CT to be attached thereto. The image forming apparatus 100 consumes a consumable TN accommodated in the replacement part CT to form an image on a sheet S. In the first embodiment, the consumable TN is toner.

Specifically, the image forming apparatus 100 includes a document reading section 10, a display section 15, a feed section 20, a conveyance section 30, an image forming section 40, an ejection section 50, a consumable supply section 60, a control device 70, a temperature sensor 80, and a power supply 90. The power supply 90 supplies electric power to components of the image forming apparatus 100. The temperature sensor 80 corresponds to one example of a "temperature detector".

The document reading section 10 reads an image of a document G for example of which one or more copies are to be made. The display section 15 displays various images.

The display section 15 includes for example a liquid-crystal display. The display section 15 may include for example a touch panel.

The feed section 20 accommodates sheets S and feeds the sheets S to the conveyance section 30 one at a time. Material examples of the sheets S include paper and synthetic resin. The conveyance section 30 includes conveyance rollers and conveys the sheet S to the image forming section 40.

The image forming section 40 consumes the consumable TN to form an image on the sheet S. Specifically, the image forming section 40 includes a photosensitive drum 41, a charger 42, a light exposure device 43, a development device 44, a transfer device 45, a cleaner 46, and a fixing device 47.

The charger 42 charges the photosensitive drum 41 to a predetermined potential. The light exposure device 43 outputs laser light based on image data to expose the photosensitive drum 41, thereby forming an electrostatic latent image according to the image data on the photosensitive drum 41. The development device 44 supplies the toner to the electrostatic latent image on the photosensitive drum 41 to develop the electrostatic latent image, thereby forming a toner image on the photosensitive drum 41. The transfer device 45 transfers the toner image on the photosensitive drum 41 to the sheet S. The cleaner 46 removes residual toner remaining on the photosensitive drum 41 after the transfer of the toner image. The fixing device 47 applies pressure and heat to the toner image, thereby fixing the toner image as an image on the sheet S.

The conveyance section 30 conveys, to the ejection section 50, the sheet S with the image fixed thereon. The ejection section 50 ejects the sheet S out of the image forming apparatus 100.

The consumable supply section 60 supplies the consumable TN to the image forming section 40. Specifically, the consumable supply section 60 includes an attachment section 60a. The attachment section 60a allows the replacement part CT to be detachably attached thereto. That is, the replacement part CT is to be attached to the image forming apparatus 100. The replacement part CT accommodates the consumable TN to be supplied to the image forming apparatus 100. Specifically, the consumable TN accommodated in the replacement part CT is supplied to the image forming section 40. More specifically, the consumable TN accommodated in the replacement part CT is supplied to the development device 44.

The replacement part CT in the first embodiment is a toner container. The replacement part CT includes a container 200 and an authentication section 202. The container 200 accommodates the consumable TN. The authentication section 202 is a part for authenticating the replacement part CT and is activated when the control device 70 performs an authentication process of the replacement part CT. The authentication section 202 includes an authentication integrated circuit (IC) 202a and an authentication substrate 202b. The authentication IC 202a corresponds to one example of a "semiconductor device".

The authentication IC 202a is mounted on the authentication substrate 202b. The authentication IC 202a is a semiconductor device for authenticating the replacement part CT and is activated when the control device 70 performs an authentication process of the replacement part CT.

The temperature sensor 80 faces the authentication IC 202a with an intervening space. The temperature sensor 80 detects a temperature of the authentication IC 202a and provides the control device 70 with temperature information representing the temperature of the authentication IC 202a. The temperature sensor 80 includes for example a thermistor. The power supply 90 supplies electric power to the authentication section 202 and the control device 70.

Figure 2:
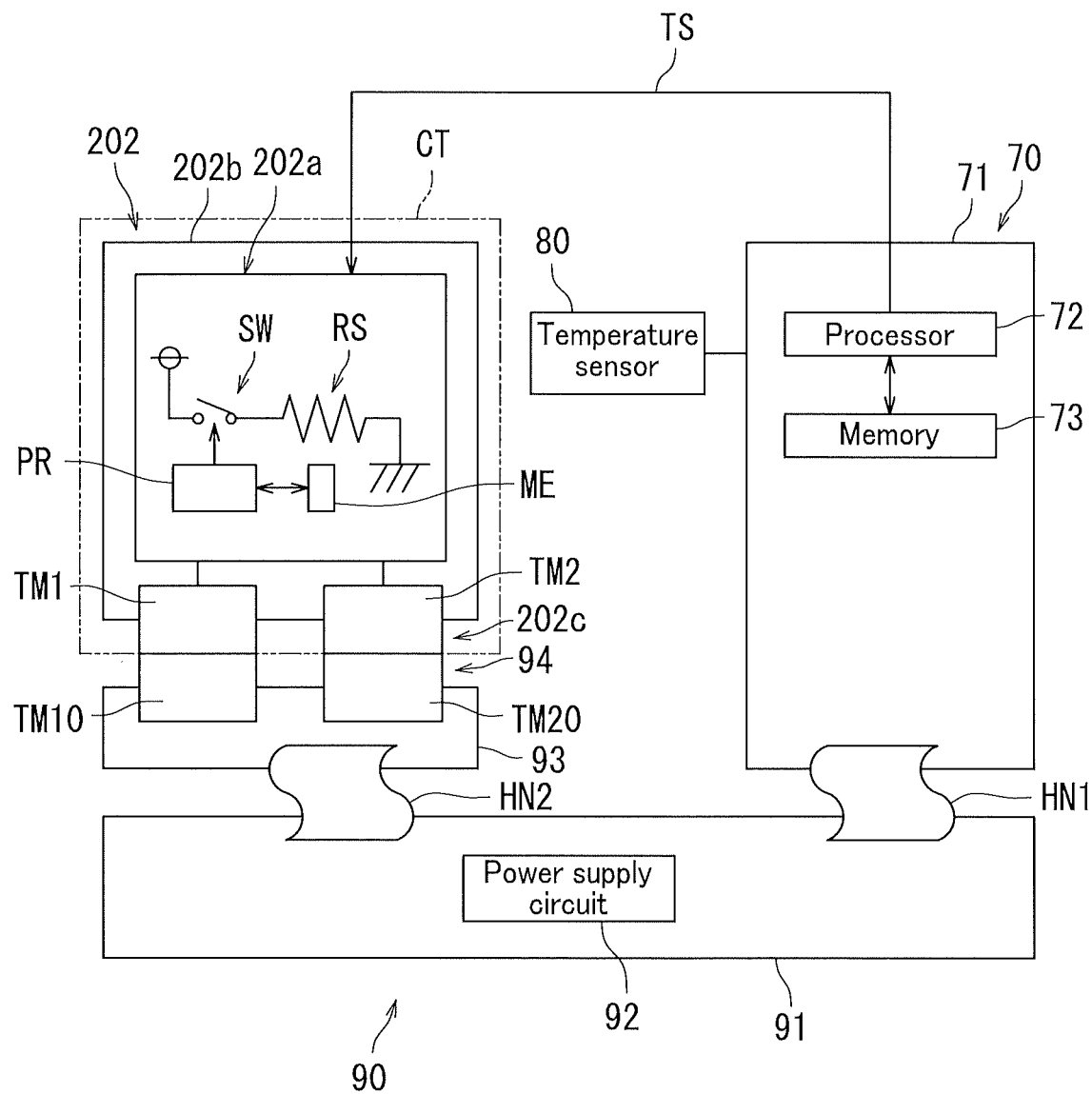
FIG. 2 illustrates an authentication section, a power supply, and a controller of the image forming apparatus according to the first embodiment.

The authentication section 202, the power supply 90, and the control device 70 will next be described with reference to FIG. 2. FIG. 2 illustrates the authentication section 202, the power supply 90, and the control device 70.

As illustrated in FIG. 2, the replacement part CT further includes a connector 202c. The connector 202c is electrically connected to the authentication substrate 202b. The connector 202c includes a power terminal TM1 and a ground terminal TM2. Each of the power terminal TM1 and the ground terminal TM2 is plated with for example gold. Each of the power terminal TM1 and the ground terminal TM2 is electrically connected to the authentication substrate 202b.

The power supply 90 includes a power supply substrate 91, a power supply circuit 92, a relay substrate 93, a connector 94, a power cable HN1, and a power cable HN2. The connector 94 is electrically connected to the relay substrate 93. The connector 94 includes a power terminal TM10 and a ground terminal TM20. Each of the power terminal TM10 and the ground terminal TM20 is electrically connected to the relay substrate 93.

The connector 202c of the authentication section 202 is electrically connected to the connector 94 of the relay substrate 93. Specifically, the power terminal TM1 is electrically connected with the power terminal TM10, while the ground terminal TM2 is electrically connected with the ground terminal TM20.

The power cable HN2 electrically connects the relay substrate 93 to the power supply substrate 91. The power cable HN2 is for example a cable harness. The power supply circuit 92 is mounted on the power supply substrate 91. The power supply circuit 92 generates an internal power supply voltage based on an external power supply voltage. The power supply circuit 92 applies the internal power supply voltage to the authentication IC 202a through the power cable HN2, the connector 94, and the connector 202c.

The authentication IC 202a includes a load element RS, a switching element SW, a processor PR, and memory ME. Examples of the memory ME include non-volatile memory and volatile memory. The processor PR controls the switching element SW. For example, the processor PR executes a computer program stored in the memory ME, thereby controlling the switching element SW. In this case, the processor PR includes for example a central processing unit (CPU). Note that the processor PR may be constituted by a wired logic. Examples of the processor PR in this case include a field programmable gate array (FPGA) and an application specific integrated circuit (ASIC).

The load element RS is supplied with an electric current according to the internal power supply voltage. A temperature of the authentication IC 202a varies according to Joule heat generated when the electric current flows through the load element RS. That is, the load element RS controls the temperature of the authentication IC 202a. The load element RS is for example a resistance element.

The switching element SW is connected to the load element RS. The switching element SW is controlled by the processor PR, thereby switching between supply of an electric current to the load element RS and a cut-off of the supply. The switching element SW includes for example a transistor that is for example a field effect transistor. When the switching element SW is turned on, the load element RS is supplied with the electric current. This raises a temperature of the load element RS to cause a temperature rise in the authentication IC 202a. In contrast, when the switching element SW is turned off, the supply of the electric current to the load element RS is cut off.

The processor PR controls ON time and OFF time of the switching element SW to control an electric current flowing through the load element RS, thereby controlling the temperature of the load element RS. The temperature of the authentication IC 202a therefore varies according to the temperature of the load element RS. That is, the processor PR controls the temperature of the authentication IC 202a through the switching element SW and the load element RS.

The temperature sensor 80 detects a temperature of the authentication IC 202a and provides the control device 70 with temperature information representing the temperature of the authentication IC 202a. In one example, but not limited thereto, the temperature sensor 80 detects (measures) a series of temperatures of the authentication IC 202a at prescribed intervals and provides the control device 70 with a series of pieces of temperature information representing the series of temperatures.

The control device 70 includes a control substrate 71, a processor 72, and memory 73. The processor 72 and the memory 73 are mounted on the control substrate 71. The processor 72 is one example of a "controller".

The power cable HN1 electrically connects the control substrate 71 to the power supply substrate 91. The power cable HN1 is for example a cable harness. The power supply circuit 92 applies the internal power supply voltage to the processor 72 and the memory 73 through the power cable HN1.

The processor 72 executes a computer program stored in the memory 73, thereby controlling components of the image forming apparatus 100. The processor 72 includes for example a CPU. Examples of the memory 73 include non-volatile memory and volatile memory. The processor 72 may be connected to for example an auxiliary storage device such as a hard disk drive (HDD).

Figure 3:
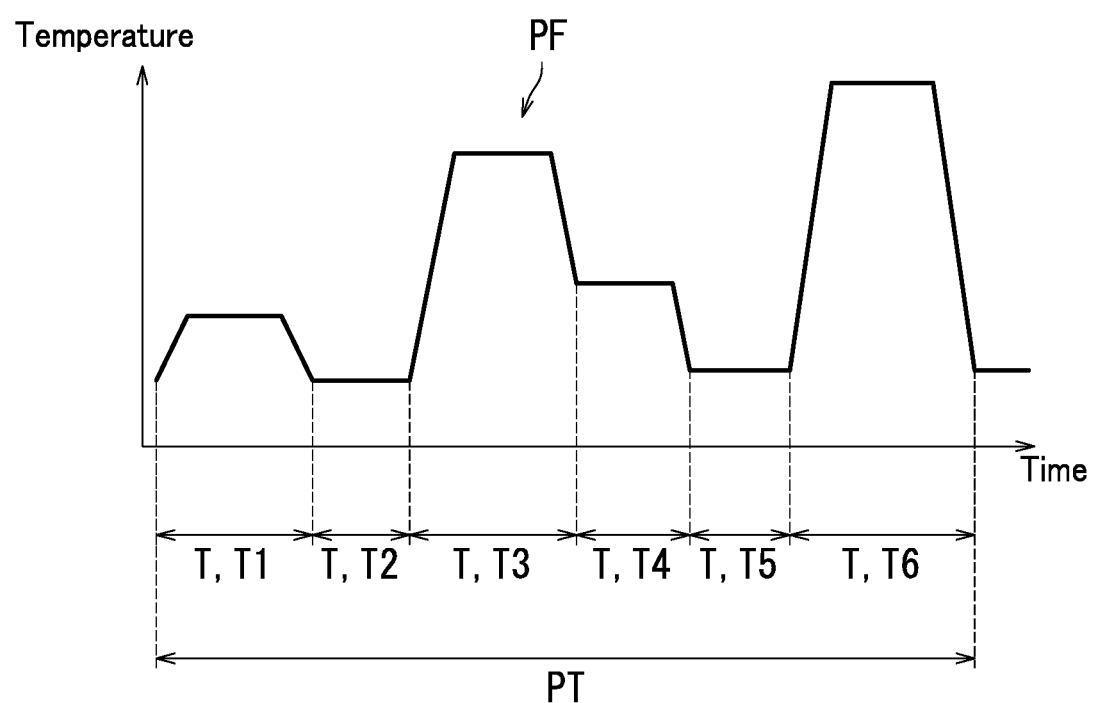
FIG. 3 illustrates an example of a specific temperature profile in the first embodiment.

An authentication process of the replacement part CT will next be described with reference to FIGS. 2 and 3. FIG. 3 illustrates an example of a specific temperature profile PF. In FIG. 3, a horizontal axis represents time and a vertical axis represents a temperature. As illustrated in FIG. 3, each of the memory ME of the authentication IC 202a and the memory 73 of the control device 70 illustrated in FIG. 2 stores therein information representing the specific temperature profile PF.

The specific temperature profile PF has an outline representing a specific change of temperature with time. In the first embodiment, the specific temperature profile PF represents a change of temperature during a predetermined time PT. The predetermined time PT is divided into individual times T. The specific temperature profile PF includes a constant temperature determined for each of the individual times T. In the example of FIG. 3, the predetermined time PT is divided into an individual time T1, an individual time T2, an individual time T3, an individual time T4, an individual time T5, and an individual time T6. The outline of the specific temperature profile PF may be set to any outline and is not particularly limited.

In the first embodiment, the processor PR controls the temperature of the authentication IC 202a so that the temperature of the authentication IC 202a varies according to the specific temperature profile PF. Specifically, the processor PR of the authentication IC 202a controls the electric current flowing through the load element RS through the switching element SW so that the authentication IC 202a has a temperature represented by the specific temperature profile PF stored in the memory ME. That is, the processor PR of the authentication IC 202a controls the electric current flowing through the load element RS through the switching element SW so that the authentication IC 202a generates the temperature represented by the specific temperature profile PF. In one example, but not limited thereto, the processor PR controls the electric current flowing through the load element RS through the switching element SW so that the authentication IC 202a has a series of temperatures at prescribed intervals represented by the specific temperature profile PF. Here, each of the prescribed intervals is shorter than each of the individual times T1 to T6.

The temperature sensor 80 detects a temperature of the authentication IC 202a and provides the processor 72 of the control device 70 with temperature information representing the temperature of the authentication IC 202a at prescribed intervals.

The processor 72 of the control device 70 determines whether or not the temperature of the authentication IC 202a detected by the temperature sensor 80 forms the specific temperature profile PF stored in the memory 73. In one example, but not limited thereto, the processor 72 determines whether or not an outline connecting the series of temperatures of the authentication IC 202a detected by the temperature sensor 80 forms the specific temperature profile PF.

Specifically, when determining that the temperature of the authentication IC 202a forms the specific temperature profile PF, the processor 72 of the control device 70 authenticates the replacement part CT as a first replacement part. The first replacement part is for example a dedicated part for the image forming apparatus 100. In contrast, when determining that the temperature of the authentication IC 202a does not form the specific temperature profile PF, the processor 72 of the control device 70 authenticates the replacement part CT as a second replacement part. The second replacement part is for example a replacement part different from the dedicated part for the image forming apparatus 100. For example, characteristics of a consumable (for example toner) accommodated in the second replacement part differ from characteristics of a consumable (for example toner) accommodated in the first replacement part.

As described above with reference to FIGS. 2 and 3, the first embodiment enables performance of the authentication process of the replacement part CT based on the temperature of the authentication IC 202a. It is consequently possible to perform the authentication process of the replacement part CT more precisely than an authentication process performed only by data processing. For example, even if the authentication IC 202a is analyzed by performing reverse engineering, it is difficult to manufacture ICs whose temperature varies according to the specific temperature profile PF. Therefore, there is a high possibility that an IC whose temperature varies according to the specific temperature profile PF is the authentication IC 202a. As a result, by mounting the authentication IC 202a only on each of the first replacement parts, it is possible to precisely authenticate whether or not the replacement part CT attached to the image forming apparatus 100 is the first replacement part. In other words, when the replacement part CT is the second replacement part, it is possible to prevent the replacement part CT from being incorrectly authenticated as the first replacement part.

Note that the authentication IC 202a does not necessarily include the memory ME. In the case where the authentication IC 202a does not include the memory ME, the processor PR is constituted by a wired logic performing control of the switching element SW so that the authentication IC 202a has a temperature representing the specific temperature profile PF.

Figure 4:
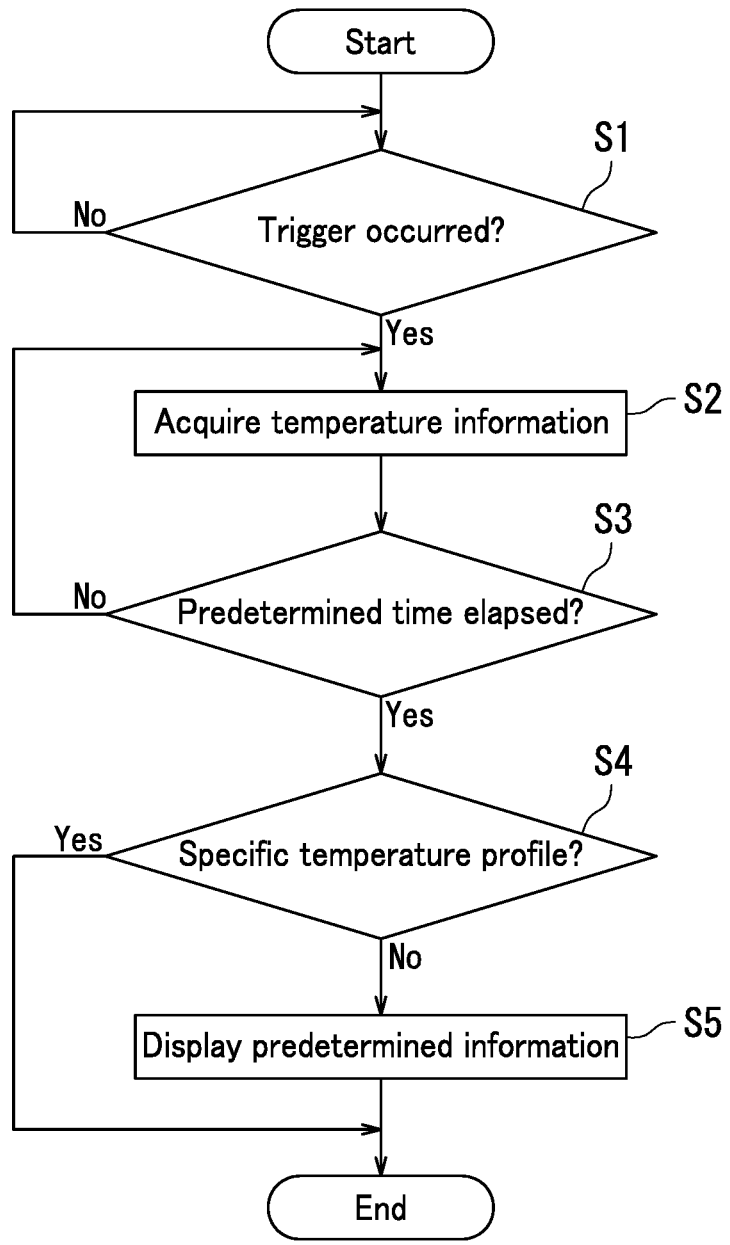
FIG. 4 is a flowchart for an authentication process performed by the image forming apparatus according to the first embodiment.

The authentication process of the replacement part CT will next be described with reference to FIGS. 2 and 4. The authentication process is performed by the processor 72 of the control device 70. FIG. 4 is a flowchart for the authentication process of the replacement part CT. As illustrated in FIG. 4, the authentication process includes Steps S1 to S5.

As illustrated in FIGS. 2 and 4, at Step S1, the processor 72 of the control device 70 determines whether or not a specific trigger has occurred. For example, the specific trigger is represented by application of the internal power supply voltage from the power supply 90 (specifically, power supply circuit 92) to the processor PR of the authentication IC 202a and the processor 72 of the control device 70 as a result of the image forming apparatus 100 being turned from OFF to ON. For example, the specific trigger is represented by electrical or mechanical detection of attachment of the replacement part CT to the image forming apparatus 100.

When it is determined at Step S1 that the specific trigger has not occurred, the process waits until the specific trigger occurs.

In contrast, when it is determined at Step S1 that the specific trigger has occurred, the process proceeds to Step S2. When the specific trigger occurs, the processor PR of the authentication IC 202a controls an electric current flowing through the load element RS through the switching element SW so that the authentication IC 202a has a temperature represented by the specific temperature profile PF.

At Step S2, the processor 72 acquires temperature information representing a temperature of the authentication IC 202a from the temperature sensor 80 and stores the temperature information in the memory 73.

At Step S3, the processor 72 determines whether or not a predetermined time PT (see FIG. 3) has elapsed since the occurrence of the specific trigger. The predetermined time PT represents a time during which the specific temperature profile PF is formed, and is stored in the memory 73.

When it is determined at Step S3 that the predetermined time PT has not yet elapsed, the process returns to Step S2.

In contrast, when it is determined at Step S3 that the predetermined time PT has elapsed, the process proceeds to Step S4. Thus, at a time when the predetermined time PT has elapsed, a temperature history that is a series of temperatures of the authentication IC 202a is stored in the memory 73. In addition, when the predetermined time PT has elapsed, the processor PR of the authentication IC 202a turns the switching element SW off.

At Step S4, the processor 72 compares the temperature history of the authentication IC 202a stored in the memory 73 and the specific temperature profile PF and determines whether or not the temperature history of the authentication IC 202a forms the specific temperature profile PF.

When it is determined at Step S4 that the temperature history of the authentication IC 202a forms the specific temperature profile PF, the processor 72 stores, in the memory 73, information representing the replacement part CT being authenticated as the first replacement part. The process then ends.

In contrast, when it is determined at Step S4 that the temperature history of the authentication IC 202a does not form the specific temperature profile PF, the processor 72 stores, in the memory 73, information representing the replacement part CT being authenticated as the second replacement part. The process then proceeds to Step S5.

At Step S5, the processor 72 performs control of the display section 15 to cause the display section 15 to display predetermined information. The display section 15 accordingly displays the predetermined information. The predetermined information is information representing for example the replacement part CT being authenticated as the second replacement part. This enables a user to recognize that the replacement part CT attached to the image forming apparatus 100 is the second replacement part by viewing the display section 15.

As described above with reference to FIG. 4, the first embodiment enables effective performance of the authentication process of the replacement part CT based on the temperature history of the authentication IC 202a.

(Variations)

An image forming apparatus 100 that is a variation, according to the first embodiment of the present disclosure will be described with reference to FIG. 2. The variation differs from the first embodiment mainly in that memory ME of an authentication IC 202a stores therein temperature profiles. Hereinafter, different points of the variation from the first embodiment will be mainly described.

The memory ME of the authentication IC 202a illustrated in FIG. 2 stores therein pieces of temperature profile information that represent mutually different temperature profiles. A processor PR of the authentication IC 202a selects a specific temperature profile PF from the temperature profiles represented by the pieces of temperature profile information. The processor PR then controls an electric current to be supplied to a load element RS through a switching element SW so that the authentication IC 202a has a temperature represented by the specific temperature profile PF selected by the processor PR.

As described above with reference to FIG. 2, in the variation, the specific temperature profile PF to be used for an authentication process of a replacement part CT is selected from the temperature profiles. This therefore enables effective prevention of imitation of the authentication IC 202a that generates a temperature represented by the specific temperature profile PF. It is consequently possible to precisely perform the authentication process of the replacement part CT.

Second Embodiment

An image forming apparatus 100 according to a second embodiment of the present disclosure will be described with reference to FIGS. 2 to 5. The second embodiment differs from the first embodiment mainly in that a control device 70 designates a temperature of an authentication IC 202a. Hereinafter, different points of the second embodiment from the first embodiment will be mainly described.

The control device 70 illustrated in FIG. 2 is wired or wireless connected to an authentication section 202. Specifically, a processor 72 of the control device 70 is wired or wireless connected to the authentication IC 202a. The processor 72 of the control device 70 transmits, to the authentication IC 202a, a temperature designating signal TS that causes the authentication IC 202a to have a temperature represented by a specific temperature profile PF. That is, the processor 72 transmits, to the authentication IC 202a, the temperature designating signal TS that causes the authentication IC 202a to generate the temperature represented by the specific temperature profile PF. The temperature designating signal TS designates the temperature of the authentication IC 202a. Specifically, the temperature designating signal TS designates a temperature varying according to the specific temperature profile PF with respect to the authentication IC 202*a*.

A processor PR of the authentication IC 202*a* controls a switching element SW according to the temperature designating signal TS received from the processor 72 of the control device 70 so that the authentication IC 202*a* has a temperature represented by the specific temperature profile PF. That is, the processor PR of the authentication IC 202*a* controls the switching element SW according to the temperature designating signal TS entered from an outside so that the authentication IC 202*a* has the temperature represented by the specific temperature profile PF.

The processor 72 of the control device 70 acquires temperature information representing a temperature of the authentication IC 202*a* from a temperature sensor 80. The processor 72 then determines whether or not a series of temperatures of the authentication IC 202 detected by the temperature sensor 80 forms the specific temperature profile PF. That is, the processor 72 determines whether or not the series of temperatures of the authentication IC 202 detected by the temperature sensor 80 forms the specific temperature profile PF corresponding to a series of temperatures designated by a series of temperature designating signals TS.

Specifically, when determining that the series of temperatures of the authentication IC 202*a* forms the specific temperature profile PF, the processor 72 of the control device 70 authenticates a replacement part CT attached to the image forming apparatus 100 as a first replacement part. In contrast, when determining that the series of temperatures of the authentication IC 202*a* does not form the specific temperature profile PF, the processor 72 of the control device 70 authenticates the replacement part CT as a second replacement part.

As described above with reference to FIG. 2, the second embodiment enables performance of an authentication process of the replacement part CT based on the series of temperatures of the authentication IC 202*a* like the first embodiment. It is consequently possible to perform the authentication process of the replacement part CT more precisely than an authentication process performed only by data processing.

In addition, the second embodiment enables the processor 72 of the control device 70 to designate the specific temperature profile PF for the authentication IC 202*a* through the series of temperature designating signals TS. It is consequently possible to more precisely perform the authentication process of the replacement part CT. For example, even if the authentication IC 202*a* is analyzed by performing reverse engineering, it is difficult to manufacture ICs whose temperature varies according to the specific temperature profile PF designated by the series of temperature designating signals TS. Therefore, there is a high possibility that an IC whose temperature varies according to the specific temperature profile PF designated by the series of temperature designating signals TS is the authentication IC 202*a*. As a result, by mounting the authentication IC 202*a* only on each of the first replacement parts, it is possible to precisely authenticate whether or not the replacement part CT attached to the image forming apparatus 100 is the first replacement part. In other words, when the replacement part CT is the second replacement part, it is possible to prevent the replacement part CT from being authenticated as the first replacement part.

Figure 5:
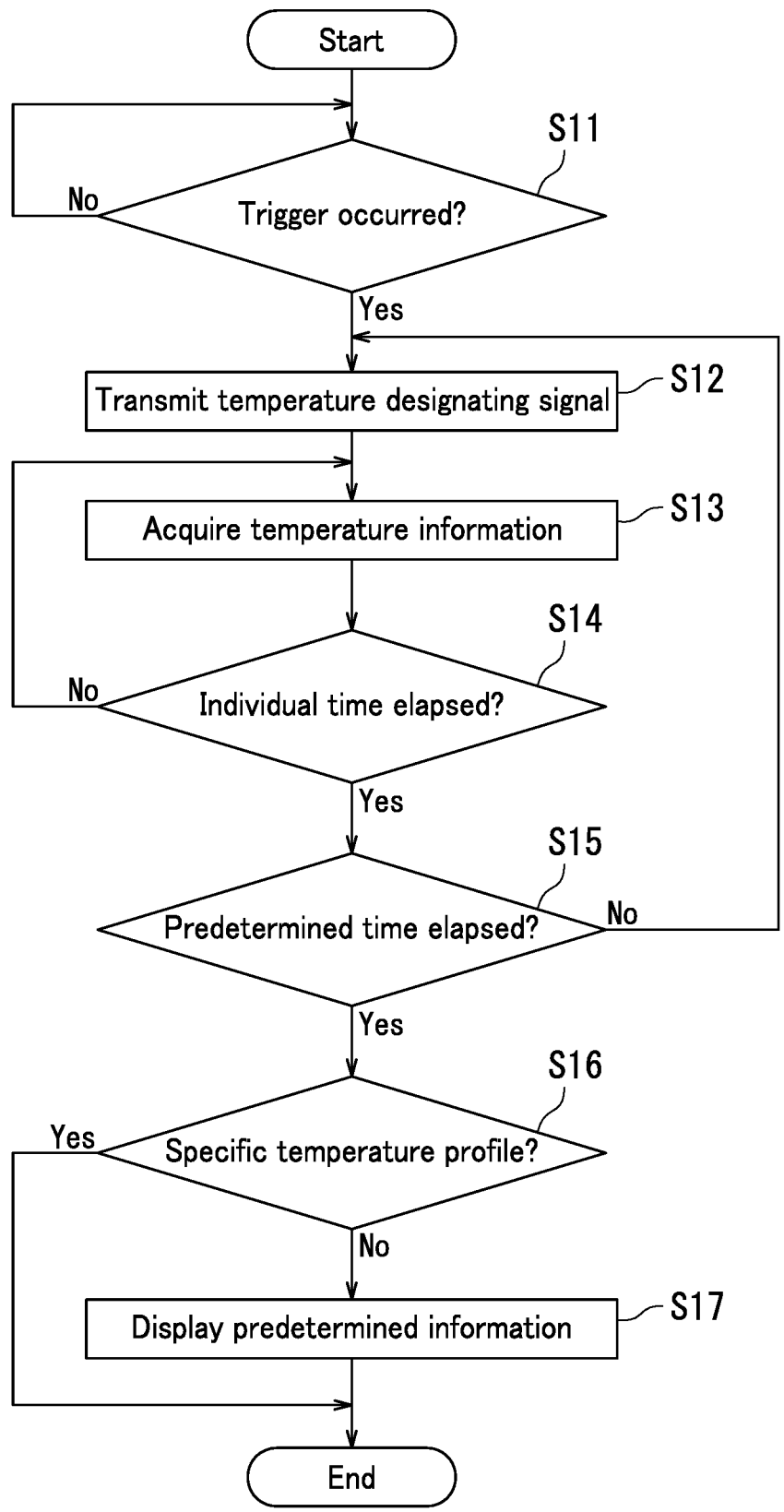
FIG. 5 is a flowchart for an authentication process performed by an image forming apparatus according to a second embodiment of the present disclosure.

An authentication process of the replacement part CT will next be described with reference to FIGS. 2 and 5. The authentication process is performed by the processor 72 of the control device 70. FIG. 5 is a flowchart for the authentication process of the replacement part CT. As illustrated in FIG. 5, the authentication process includes Steps S11 to S17.

As illustrated in FIGS. 2 and 5, at Step S11, the processor 72 of the control device 70 determines whether or not a specific trigger has occurred. The specific trigger is the same as the specific trigger described at Step S1 of FIG. 4.

When it is determined at Step S11 that the specific trigger has not occurred, the process waits until the specific trigger occurs.

In contrast, when it is determined at Step S11 that the specific trigger has occurred, the process proceeds to Step S12.

At Step S12, the processor 72 transmits a temperature designating signal TS to the authentication IC 202*a*. The processor PR of the authentication IC 202*a* accordingly controls the switching element SW according to the temperature designating signal TS so that a temperature of the authentication IC 202*a* has a temperature represented by the temperature designating signal TS.

At Step S13, the processor 72 acquires temperature information representing a temperature of the authentication IC 202*a* from the temperature sensor 80 and stores the temperature information in memory 73.

At Step S14, the processor 72 determines whether or not an individual time T (see FIG. 3) has elapsed since transmission of the temperature designating signal TS to the authentication IC 202*a*. The individual time T is stored in the memory 73.

When it is determined at Step S14 that the individual time T has not yet elapsed, the process returns to Step S13.

In contrast, when it is determined at Step S14 that the individual time T has elapsed, the process proceeds to Step S15. Thus, when the individual time T has elapsed, storage of a temperature history that is a series of temperatures of the authentication IC 202*a* during the individual time T in the memory 73 is completed.

At Step S15, the processor 72 determines whether or not a predetermined time PT (see FIG. 3) has elapsed since the occurrence of the specific trigger. The predetermined time PT is stored in the memory 73.

At Step S15, when it is determined that the predetermined time PT has not yet elapsed, the process returns to Step S12. Steps S12 to S14 are performed until transmission of a series of temperature designating signals TS representing the specific temperature profile PF is completed.

In contrast, at Step S15, when it is determined that the predetermined time PT has elapsed, the process proceeds to Step S16. Thus, when the predetermined time PT has elapsed, the storage of a temperature history that is a series of temperatures of the authentication IC 202*a* during the predetermined time PT in the memory 73 is completed. Moreover, when the predetermined time PT has elapsed, transmission of a series of temperature designating signals TS representing the specific temperature profile PF is completed. Moreover, when the predetermined time PT has elapsed, the processor PR of the authentication IC 202*a* turns the switching element SW off.

At Step S16, the processor 72 compares the temperature history of the authentication IC 202*a* stored in the memory 73 and the specific temperature profile PF and determines whether or not the temperature history of the authentication IC 202*a* forms the specific temperature profile PF.

When it is determined at Step S16 that the temperature history of the authentication IC 202*a* forms the specific temperature profile PF, the processor 72 stores information representing the replacement part CT being authenticated as the first replacement part in the memory 73. The process then ends.

In contrast, at Step S16, when it is determined that the temperature history of the authentication IC 202a does not form the specific temperature profile PF, the processor 72 stores information representing the replacement part CT being authenticated as the second replacement part in the memory 73. The process then proceeds to Step S17.

At Step S17, the processor 72 performs control of the display section 15 to cause the display section 15 to display predetermined information. The display section 15 accordingly displays the predetermined information. The predetermined information is information representing for example the replacement part CT being authenticated as the second replacement part.

As described above with reference to FIG. 5, the second embodiment enables effective performance of the authentication process of the replacement part CT based on the temperature history of the authentication IC 202a.

The embodiments of the present disclosure have been described above with reference to the accompanying drawings. However, the present disclosure is not limited to the above-described embodiments and can be practiced in various ways within the scope without departing from the essence of the present disclosure. Furthermore, the elements of configuration disclosed in the above-described embodiments can be altered as appropriate. For example, some of all elements of configuration depicted in an embodiment may be added to elements of configuration in another embodiment, or some of the elements of the configuration may be omitted among all of the elements of configuration described in the embodiments.

The drawings schematically illustrate elements of configuration in order to facilitate understanding of the present disclosure. Aspects such as thickness, length, and the number of the elements of configuration illustrated in the drawings may differ from actual aspects thereof in order to facilitate preparation of the drawings. Furthermore, configurations of the elements of configuration described in the above embodiment are merely examples and are not intended as specific limitations. Various alterations may be made so long as there is no substantial deviation from the effects of the present disclosure.

What is claimed is:

1. A semiconductor device comprising:
a load element configured to control a temperature of the semiconductor device with an electric current supplied to the load element;
a switching element configured to switch between supply of an electric current to the load device and a cut-off of the supply; and
a processor configured to control the switching element, wherein
the processor controls the electric current to be supplied to the load element through the switching element so that the semiconductor device has a series of temperatures represented by a specific temperature profile.

2. The semiconductor device according to claim 1 further comprising
memory that stores therein pieces of temperature profile information representing mutually different temperature profiles, wherein
the processor selects the specific temperature profile from the temperature profiles.

3. The semiconductor device according to claim 1, wherein
the processor controls the switching element according to a temperature designating signal entered from an outside so that the semiconductor device has the series of temperatures represented by the specific temperature profile.

4. A replacement part that is attachable to an image forming apparatus and that accommodates a consumable to be supplied to the image forming apparatus, comprising:
a container that accommodates the consumable; and
a semiconductor device, wherein
the semiconductor device includes:
a load element configured to be supplied with an electric current and control a temperature of the semiconductor device;
a switching element configured to switch between supply of the electric current to the load element and a cut-off of the supply; and
a processor configured to control the switching element, and
the processor controls the electric current to be supplied to the load element through the switching element so that the semiconductor device has a series of temperatures represented by a specific temperature profile.

5. An image forming apparatus that allows a replacement part including a semiconductor device to be attached thereto and that consumes a consumable accommodated in the replacement part to form an image on a sheet, comprising:
a temperature detector configured to detect a temperature of the semiconductor device; and
a controller configured to determine whether or not temperatures detected by the temperature detector forms a specific temperature profile, wherein
the controller transmits, to the semiconductor device, a temperature designating signal that designates a temperature of the semiconductor device so that the semiconductor device has a series of temperatures represented by the specific temperature profile.

6. The image forming apparatus according to claim 5, wherein
the semiconductor device includes:
a load element configured to control a temperature of the semiconductor device with an electric current supplied to the load element;
a switching element configured to switch between supply of the electric current to the load element and a cut-off of the supply; and
a processor configured to control the switching element, and
the processor controls the electric current to be supplied to the load element through the switching element so that the semiconductor device has a series of temperatures represented by the specific temperature profile.

* * * * *